United States Patent [19]

Sullivan et al.

[11] 4,364,762
[45] Dec. 21, 1982

[54] MINERAL FIBER FORMING

[75] Inventors: Timothy A. Sullivan, Newark, Ohio; James Whitfield, Jr., Anderson, S.C.

[73] Assignee: Owens-Corning Fiberglas Corporation, Toledo, Ohio

[21] Appl. No.: 308,227

[22] Filed: Oct. 5, 1981

[51] Int. Cl.³ .......................................... C03B 37/025
[52] U.S. Cl. .............................................. 65/2; 65/12
[58] Field of Search ...................... 65/2, 11.1, 12, 10.1

[56] References Cited

U.S. PATENT DOCUMENTS

| | | | |
|---|---|---|---|
| 3,539,317 | 11/1970 | Smith | 65/10.1 |
| 3,986,853 | 10/1976 | Coggin, Jr. et al. | 65/2 |
| 4,033,742 | 7/1977 | Nichols et al. | 65/2 |
| 4,118,210 | 10/1978 | Watanabe et al. | 65/2 |
| 4,256,477 | 3/1981 | Moody | 65/12 X |

FOREIGN PATENT DOCUMENTS 1235520 5/1960 France ........................ 65/12

Primary Examiner—Robert L. Lindsay, Jr.
Attorney, Agent, or Firm—Ronald C. Hudgens; Philip R. Cloutier; Ted C. Gillespie

[57] ABSTRACT

A method for producing fibers from molten mineral material in which the heat sink provided by air induced to flow in the direction of the bushing by the moving fibers is replaced during a period of fiber forming interruption by a secondary flow of air directed toward the bushing during the interruption.

1 Claim, 6 Drawing Figures

MINERAL FIBER FORMING

TECHNICAL FIELD

This invention relates to mineral fiber forming. In one of its more specific aspects, this invention relates to temperature control of the bushings from which mineral fibers are drawn.

BACKGROUND OF THE INVENTION

In the formation of mineral fibers, such as glass fibers, it is conventional to pull the mineral fibers through the apertures in a bushing, which forms the bottom of a container for molten mineral material. The molten mineral material depends from these apertures in the form of inverted cones, and the mineral fibers are drawn from these cones. The bushings can have tips or can be tipless. Conventionally, the mineral fibers are pulled downwardly at high speeds by a winder positioned beneath the bushing. During production, the moving fibers pull a substantial flow of entrained air downwardly along with the fibers. The flow of entrained air is especially strong for large throughput bushings, such as a 4000-hole, 150 pounds-per-hour bushing. At the bushing level, horizontal flows of induced air travel toward the bushing where the flows merge and turn downwardly to form the entrained air flow. These flows of induced air act as a heat sink for the newly formed fibers and for the bushing itself.

A problem encountered in conventional fiber-forming operations is that when there is an interruption of production the flow of induced air ceases, and the loss of the heat sink function of the induced air causes a temporary increase in the average temperature of the bushing. The average bushing temperature is that which would result from averaging the temperatures measured at several locations on the bushing, including the bushing sidewalls. For purposes of control, however, a single control thermocouple is usually mounted on or near the bushing bottom wall, and is used to monitor the temperature of the bushing as a whole. The power supplied to the bushing is then reduced below operation levels because the temperature sensed by the control thermocouple is required to be maintained relatively stable, even during an interruption of production. The reduction in power to the bushing causes the average bushing temperature to drop during the production interruption. Upon the resumption of production, the induced air flows recommence rather rapidly. The bushing and its power supply, however, cannot react rapidly enough to the sudden reintroduction of the heat sink provided by the induced air flows. The result is that upon resumption of production there is an initial period of approximately four to eight minutes during which the average temperature of the bushing is below nominal operating conditions. As a consequence of the depressed average bushing temperature, the throughput is reduced and the fibers are too fine in diameter, resulting in an unacceptable product.

One attempt to solve this problem, which is known as cold-start yardage, has been to program the winder speed so that upon resumption of production the fact that the initial throughput is reduced is taken into account. This attempted solution has been only partially successful because the corrective requirements dictated by the physical characteristics of each individual fiber-forming position are not always satisfied by a generalized winder speed curve. Also, the generalized winder speed curve fails to take into account the duration of the interruption of production.

By employment of the present invention, the average temperature of the bushing, and the power required to maintain that temperature, are caused to remain substantially constant during an interruption of production and the resumption of production.

SUMMARY OF THE INVENTION

According to this invention, there is provided a method for producing fibers from molten mineral material of the type in which the fibers are pulled downwardly from a heated bushing, where the downward travel of the fibers during production creates an induced air flow traveling first substantially horizontally toward the bushing and then downwardly along the path of travel of the fibers, wherein the improvement comprises maintaining both the average temperature of the bushing and the power supplied thereto substantially constant during an interruption of the induced air flow by cooling the bushing during the interruption. In one embodiment of the invention, a secondary flow of air is supplied to the bushing during the interruption in order to cool the bushing.

According to this invention, there is also provided a method for producing fibers from molten mineral material of the type in which the fibers are pulled downwardly from a heated bushing having associated therewith a temperature sensing means and a temperature control means for supplying power responsive to the temperature sensing means, where the downward travel of the fibers during production induces a flow of air traveling toward the fibers and substantially in a horizontal plane located immediately beneath the bushing, and where the induced air cools the bushing during production, where the improvement comprises supplying a secondary flow of cooling air to the bushing during cessation of the induced air flow caused by the interruption of production, the secondary flow of cooling air being of a flow rate and temperature sufficient to cause the power supplied to the bushing to remain substantially constant during the cessation of the induced air.

DESCRIPTION OF THE INVENTION

This invention will be described in terms of a glass fiber-forming operation, although it is to be understood that the invention can be practiced using other molten mineral material such as rock, slag and basalt.

Figure 1:
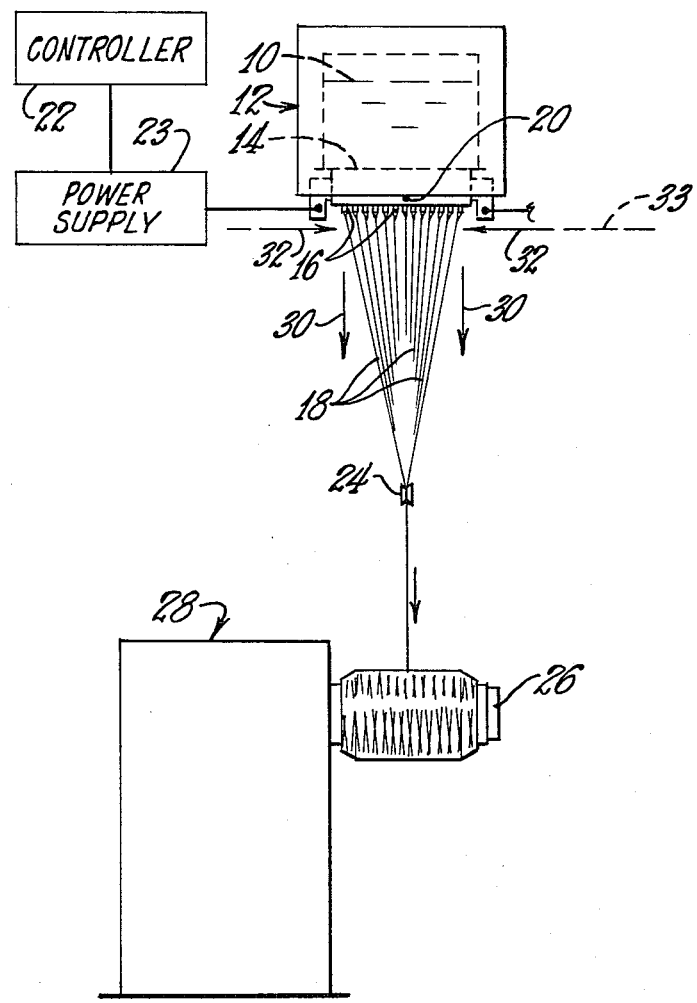
FIG. 1 is a schematic cross section in elevation of a fiber-forming position during production.

As shown in FIG. 1, molten glass 10 residing in melter 12 flows through bushing 14 and bushing tips 16 to form mineral fibers 18. Although the bushing is shown as containing tips, the invention will work equally well using a tipless bushing. The bushing employed in the present invention can be of any prior art type, and can be heated by electrical resistance heating, or by any other suitable method.

Mounted on the bushing is a temperature sensing means, such as control thermocouple 20, which senses the temperature of the bushing and transmits the sensed temperature to controller 22, via connections not shown. The controller acts in response to the sensed temperature to control the power supplied to the bushing by an appropriate source of power, such as power supply 23. The control thermocouple does not necessarily measure the average bushing temperature.

The fibers drawn from the bushing can be gathered in the conventional manner by gathering shoe 24 and wound on rotating collet 26 of winder 28. As shown by the downwardly directed arrows 30, the downward movement of the glass fibers creates a downward flow of entrained air. The downward flow of entrained air and the downward movement of the fibers cause induced air flows 32, as shown by the horizontal arrows, to travel toward the bushing and immediately below the bushing in a substantially horizontal plane, as indicated by phantom line 33. As previously stated, during production the induced air flows act as heat sinks with respect to the bushing.

Figure 2:
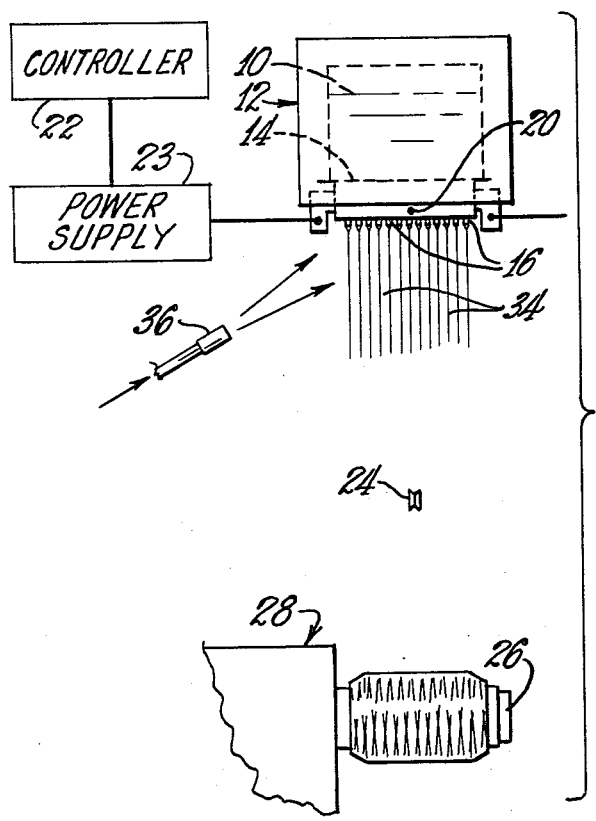
FIG. 2 is the apparatus of FIG. 1 during an interruption of production.

As shown in FIG. 2, the interruption of the production of fibers stops the entrained air flow and the induced air flow, thereby removing the heat sink from the vicinity of the bushing. As the glass slowly drips in the form of beads 34, secondary air flow nozzle 36 supplies a flow of cooling fluid, such as air, to the bushing in order to replace the heat sink function formerly provided by the induced air flow. Since the heat sink function is replaced, the power is not reduced, and the average bushing temperature does not drop. The secondary air flow nozzle can be connected to a source of cooling fluid, not shown. Alternatively, the secondary air flow nozzle can be adapted to supply ambient air from the forming room. Although not shown as such, the secondary air flow nozzle can be actuated automatically upon the detection of the interruption of the production of fibers. Alternatively, it can be operated manually.

The air flowing from the secondary nozzle can be at any flow rate and temperature sufficient to replace the heat sink function provided by the induced air flow. Preferably, the secondary air flow is ambient air, and is distributed across the width of the bushing in accordance with the heat pattern of the bushing so that hot spots in the bushing can be avoided. The secondary air flow can impinge on the bushing from any angle as long as the heat sink of the induced air flow is replaced. Preferably, the secondary air flow impinges on the bushing at an angle of about 45° to the vertical.

Figure 3:
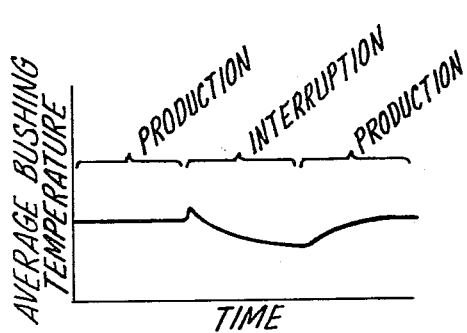
FIGS. 3 and 4 illustrate the average bushing temperature and power levels, respectively, experienced by a prior art fiber-forming bushing during a sequence of production followed by interruption of production, followed by renewed production.
Figure 4:
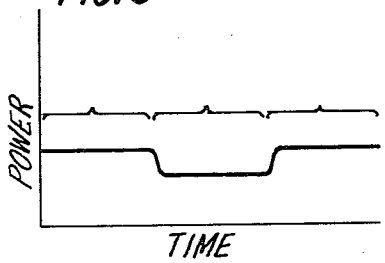
Figure 5:
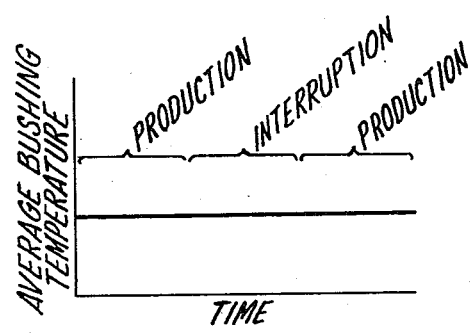
FIGS. 5 and 6 show the average bushing temperature and power levels, respectively, of a bushing operated according to the principles of the invention during a sequence of production followed by interruption of production, followed by renewed production.
Figure 6:
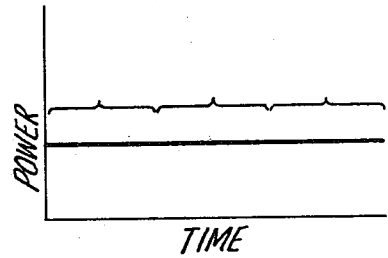

As shown in FIGS. 5 and 6, use of the invention results in a constant temperature and constant power supply during a cycle of production followed by interruption, followed by renewed production. Since the secondary air supply is designed to supply the heat sink function normally provided by the induced air flow, the duration of the production interruption has substantially no effect on the power level supply to the bushing during the interruption or upon the resumption of production. In contrast, FIGS. 3 and 4 show that under conventional systems the power supply to the bushing is reduced during a production interruption, thereby resulting in a colder average bushing temperature and cold-start yardage when production resumes.

EXAMPLE

A conventional 150 pounds-per-hour glass fiber-forming position under prior art operating procedures exhibited an initial cold-start yardage phenomenon resulting in an initial reduction (after pulling one pound of glass fibers) of 11.3% in the yards-per-pound ratio. The deviation from the desired yards-per-pound ratio diminished gradually and after six minutes there was no deviation from the ideal yardage-per-pound. The production interruption was 10 minutes in duration, and the secondary air supply according to the invention was not employed during the interruption. A subsequent production interruption of 13 minutes, during which time a secondary flow of ambient air of approximately 260 feet per minute, was directed toward the bushing, resulted in a relatively minor negative cold-start yardage (i.e., hot-start yardage) upon the resumption of fiber production. The yards-per-pound ratio after one pound of glass fibers was pulled was 2.4% too large. After two minutes, the yards-per-pound ratio reached the ideal ratio. Thus, it can be seen that the supplying of a heat sink using the secondary air flow of the present invention during the interruption of production was able to completely negate the cold-start yardage problem.

It will be evident from the foregoing that various modifications can be made to this invention. Such, however, are considered as being within the scope of the invention.

We claim:

1. The method for producing fibers from molten mineral material of the type in which said fibers are pulled downwardly from a heated bushing having associated therewith a temperature sensing means and a temperature control means for supplying power responsive to said temperature sensing means, where the downward travel of said fibers during production induces a flow of air traveling toward said fibers and substantially in a horizontal plane located immediately beneath said bushing, and where the induced air flow functions as a heat sink to cool said bushing during production, wherein the improvement comprises supplying a secondary flow of cooling air to said bushing during cessation of said induced air flow caused by the interruption of production, said secondary flow of cooling air being of a flow rate and temperature sufficient to replace the heat sink function provided by the induced air flow, thereby causing the power supplied to said bushing to remain substantially constant during said cessation of induced air.

* * * * *